No. 858,865. PATENTED JULY 2, 1907.
W. J. & P. M. FORSTER.
PLUMBING JOINT AND FITTING.
APPLICATION FILED FEB. 8, 1907.
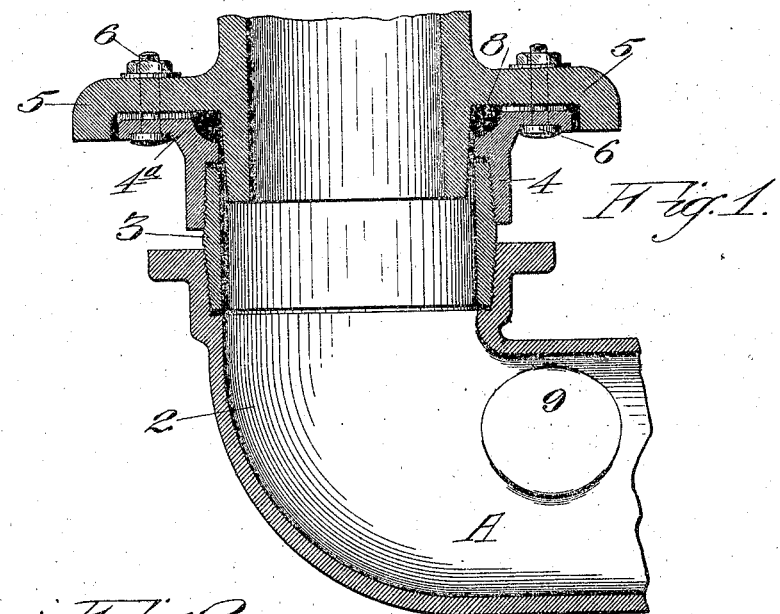
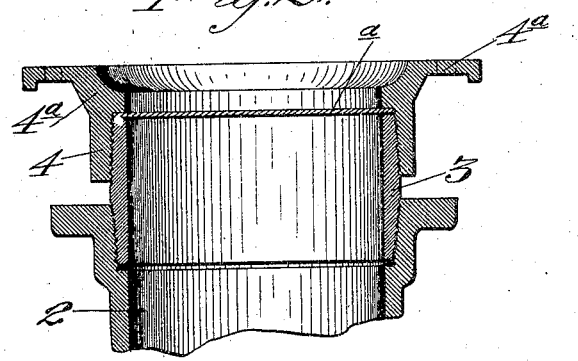
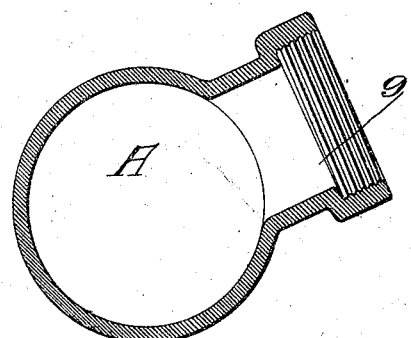
WITNESSES:
T. Hasberg.
INVENTORS
William J. Forster.
Percy M. Forster.
BY Geo. H. Strong.
ATTORNEY

UNITED STATES PATENT OFFICE.

WILLIAM J. FORSTER AND PERCY M. FORSTER, OF BERKELEY, CALIFORNIA.

PLUMBING JOINT AND FITTING.

No. 858,865.　　　Specification of Letters Patent.　　　Patented July 2, 1907.

Application filed February 8, 1907. Serial No. 356,304.

*To all whom it may concern:*

Be it known that we, WILLIAM J. FORSTER and PERCY M. FORSTER, citizens of the United States, residing at Berkeley, in the county of Alameda and State of California, have invented new and useful Improvements in Plumbing Joints and Fittings, of which the following is a specification.

Our invention relates to an improved plumbing joint and fitting which is especially designed where connections are to be made through floors, and its object is to form a tight reliable joint and at the same time to reduce the space occupied by such joint.

It consists in the combination of parts and details of construction which will be more fully explained by reference to the accompanying drawings, in which—

Figure 1 is a sectional view of our joint connection. Fig. 2 is a similar view showing the testing plate *a* in position. Fig. 3 is a section through the air vent.

In the connection of closet bowls and the like with discharge pipes, it is customary to fit a brass or other section into the upper end of the cast iron discharge pipe with an oakum and lead packing, and to connect a lead pipe with the brass pipe with what is termed a "wipe joint", and this again is connected with the bottom of the bowl connection by a flange and bolts securing the bowl to the floor and connecting with the pipes below. This connection makes a long, inconvenient and difficult one to keep tight.

It is the object of our invention to make a short, tight and sanitary connection, easily put together and maintained.

In the accompanying drawing A is the cast or other iron escape pipe, having an elbow and upturned end as at 2. Within this upturned end is fitted a screw-threaded nipple 3. We have shown this nipple as being tapered both ways from the center; the upper part being also screw-threaded, and upon this is screwed a short brass tubular section 4 having a floor flange 4ᵃ which is connected with the flange 5 of the bowl by bolts 6. The interior angle of this connection 4—4ᵃ has a segmental groove or channel formed around the angle; this groove being shown here as approximately a quadrant in cross-section. Within this groove is fitted a similarly shaped rubber gasket 8, and when the parts are bolted together the flat sides of the gasket fit into the angle at the bottom of the bowl flange and thus makes a thoroughly tight and sanitary joint. The whole length of the parts from the elbow of the pipe A to the flange of the bowl is exceedingly short, and the connection can be made in cramped places where the ordinary connection could not be used at all.

For testing purposes I employ a thin sheet metal flange as at *a*, which fits between the nipple 3 and the brass flange 4, and which temporarily closes the passage through the parts so that the proper test may be applied to insure that the joints and connections are all tight; after this is completed the thin metal sheet may be punched or cut out, leaving the apparatus in proper condition.

9 is an air vent outlet from the pipe A, and this outlet is inclined upwardly, so that any back water from the pipe will readily return to the pipe to be discharged in the direction of the flow of the current.

Having thus described our invention, what we claim and desire to secure by Letters Patent, is—

1. In a plumbing joint and fitting the combination with the flanged base of the bowl and a conducting pipe having an upper end terminating below said base, of a threaded nipple fixed in the upper end of said pipe and extending above the same, and a tubular section threaded into engagement with the upper projecting end of the nipple and having an integral floor flange and means for securing the same to the flanged base of the bowl, said tubular section having its interior angle provided with a segmental groove of substantially quadrant-shape in cross-section, and a packing substantially conforming to the cross-sectional shape of the groove and having flat sides to fit into the angle at the bottom of the base flange of the bowl.

2. In a plumbing joint and fitting, a conducting pipe having an upturned elbow, a nipple screwed into the upturned end of the elbow, a brass flange adapted to be screwed upon the upper end of the nipple, a thin metal plate clamped between the nipple and shoulder of the flange, a segmental groove formed on the inner end of the flange, a packing gasket fitting said groove, and a bowl having a flange corresponding with the gasket holding flange and secured thereto by bolts.

In testimony whereof we have hereunto set our hands in presence of two subscribing witnesses.

WILLIAM J. FORSTER.
　　　　　　　　PERCY M. FORSTER.

Witnesses:
　J. R. FAIRCHILD,
　WM. F. LORENZ.